March 20, 1928. 1,663,510
E. G. WESSMAN
DISPENSING DEVICE
Filed Sept. 12, 1924   3 Sheets-Sheet 3
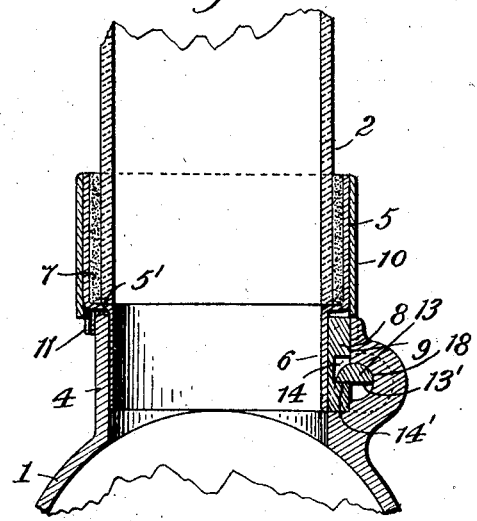
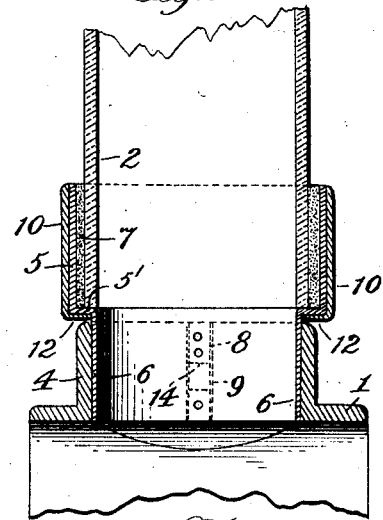
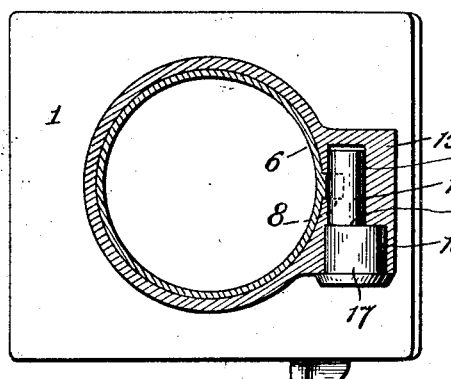
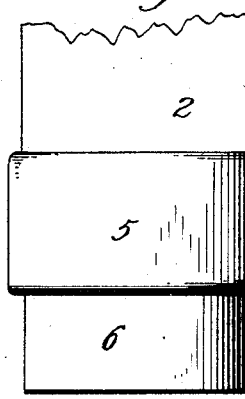
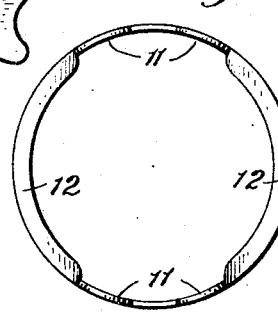
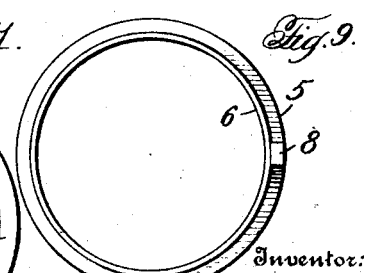

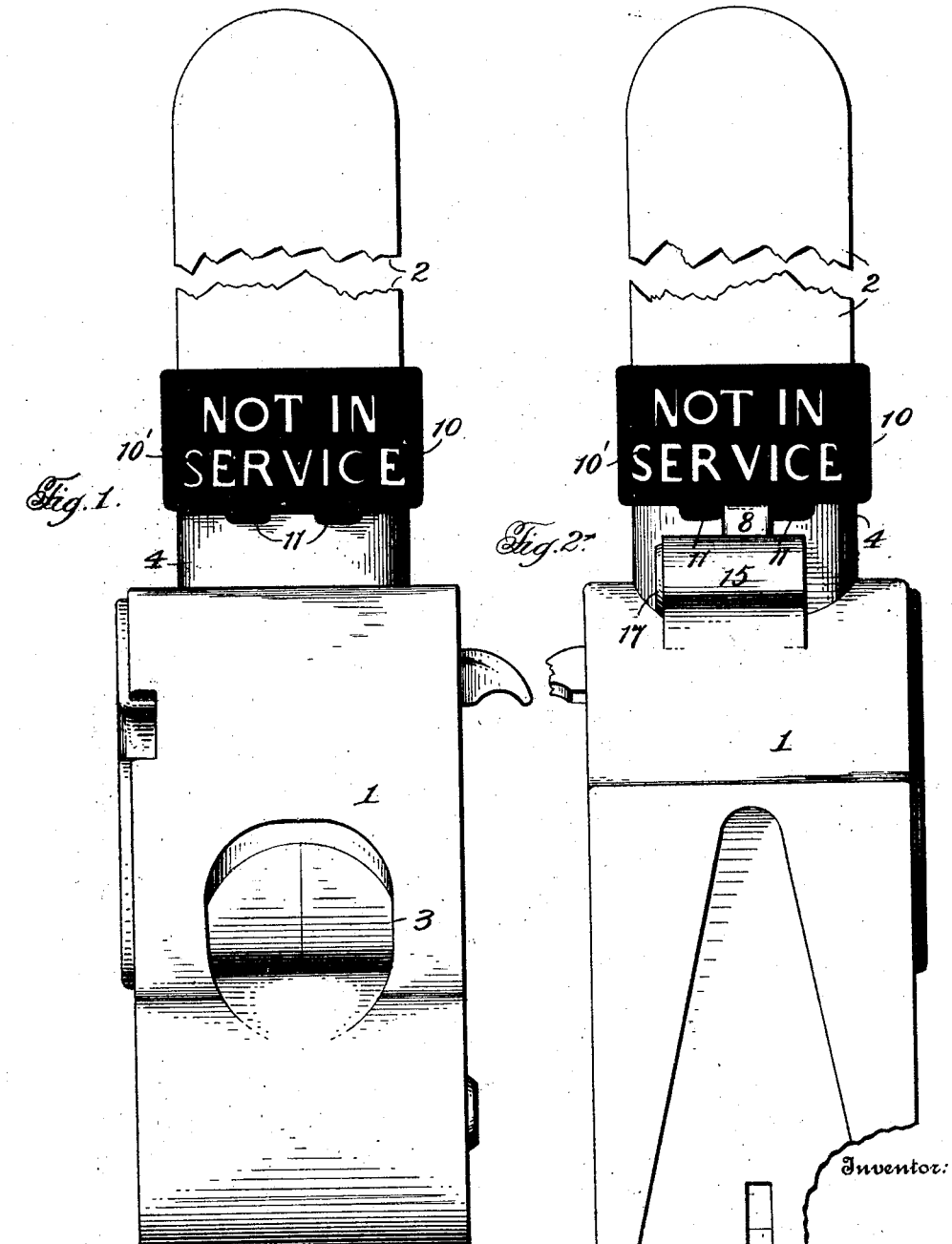

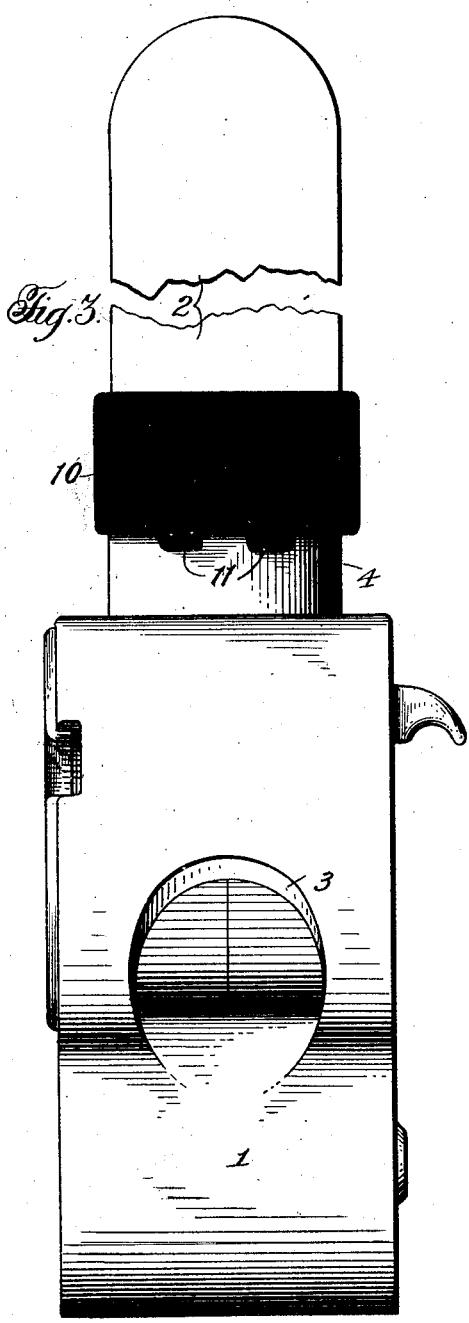
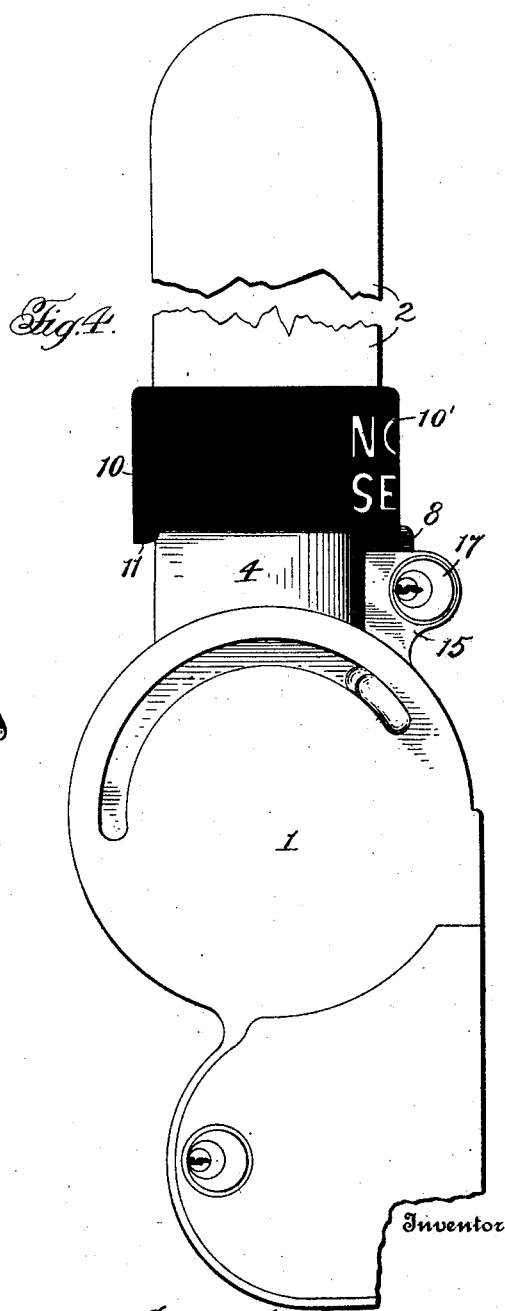

Patented Mar. 20, 1928.

1,663,510

UNITED STATES PATENT OFFICE.

EDWIN G. WESSMAN, OF EASTON, PENNSYLVANIA, ASSIGNOR TO INDIVIDUAL DRINKING CUP COMPANY, INC., OF EASTON, PENNSYLVANIA, A CORPORATION OF PENNSYLVANIA.

DISPENSING DEVICE.

Application filed September 12, 1924. Serial No. 737,363.

This invention relates to improvements in dispensing devices and more especially to improved indicating means therefor, the same being particularly useful with dispensing devices of the coin or check controlled type for indicating when the apparatus is not in service as when the same does not contain any articles to be dispensed.

The object of the invention is to provide improved indicating means of a simple and efficient nature compactly arranged with the structure of the dispensing device and adapted to be easily adjusted or set to give the desired indication.

Another object of the invention is to provide improved indicating means of the character referred to constructed as a part separate and distinct from the dispensing apparatus and adapted to be readily applied thereto.

A further object of the invention is to provide improved indicating means of the nature referred to with means for locking the same in set position against the unauthorized operation thereof.

In the drawings:

Figure 1 is a front elevation of a dispensing device equipped with indicating means in accordance with the present invention the indicating means being shown positioned with its signal facing to the front of the casing in view.

Fig. 2 is a rear elevation, the indicating means being shown arranged with its sign facing to the rear of the casing.

Fig. 3 is a front elevation, with the indicating means arranged with its sign facing toward the rear of the casing.

Fig. 4 is a side elevation, the indicating means being shown with its sign facing toward the rear of the casing.

Fig. 5 is a vertical section.

Fig. 6 is a vertical section taken at right angles to the vertical section of Figure 5.

Fig. 7 is a horizontal section.

Fig. 8 is a detail side elevation of the lower part of the container.

Fig. 9 is a detail bottom plan view of the container.

Fig. 10 is a detail side elevation of the sign bearing ring like member.

Fig. 11 is a detail bottom plan view of the sign bearing ring like member.

The invention contemplates a dispensing device having a supporting casing provided with a socket part, a container adapted to be detachably seated in said socket part, and a separate ring like member bearing thereupon a sign and adapted to detachably fit on the container tube for rotary adjustment relatively thereto and to the socket part to position the same with its sign facing to the front of the casing in view or to position the same with its sign disposed out of said position at a different point about the casing out of view. The invention further comprehends means for positioning and holding the ring like sign bearing member in its different positions of adjustment together with means for locking the same to the casing.

In the drawings, the invention is shown applied to a commercial form of device for vending paper cups, the same comprising a metal casing 1 adapted to be secured to a suitable support and constituting a support for a container tube 2 and check controlled mechanism (not shown) for delivering cups singly from a stack of nested cups within the container to the delivery opening 3 of the casing 1, the casing having a socket part 4 in which the container 2 is detachably seated.

Referring to a detail description of the particular embodiment of the invention illustrated in the drawings, the container tube 2, which is preferably formed of glass, is provided at its lower end with a metal collar or thimble having an upper socket part 5 extending over the lower end of the glass container tube 2, and a lower section 6 of less diameter than the socket part 5 adapted to fit into the socket part 4 of the casing 1, the lower section 6 of the collar or thimble extending end to end in alignment with and forming a continuation of the glass container tube 2. The collar or thimble is fixedly secured on the glass container tube 2 by plaster of Paris 7 or other suitable cementitious material. In the particular construction shown the socket part 4 of the casing and the collar or thimble of the container including its lower section 6, which fits within the socket part 4 are cylindrical in form, and said parts are provided with portions which interfit one with the other when the container is seated in the socket part 4 and serve to hold the container against rotary movement relatively to the casing. For this purpose the lower section 6 of the collar or thimble of the container is provided with a lug 8 to engage a recess 9 on the socket part 4. The recess 9 is located at the rear side of the casing at a point in a line extending centrally of the casing from front to rear, and said recess is provided by a tubular lateral extension of the socket part 4.

10 designates the separate ring like member bearing a sign 10′ and adapted to be associated with the lower part of the container and the socket part 4 of the casing for adjustment relatively to the casing and the container to position its sign 10′ to the front of the casing, in view, as shown in Figure 1 of the drawings or to position the same with its sign 10′ disposed at a different point about the casing, out of view, preferably facing to the rear of the casing, as illustrated in Figure 3 of the drawings, the sign 10′ being here shown as consisting of the words "Not in service" to thus inform the user when the dispensing apparatus is not in service as when the same does not contain any articles to be dispensed. The ring like member 10, which is in the form of a band, preferably constructed of metal, is adapted to detachably fit over the upper socket part 5 of the collar or thimble of the container. The band 10 is provided on its lower end with pairs of downwardly projecting spaced portions or ears 11, each pair of spaced ears 11 providing a notched portion to engage the tubular lateral projection 9 located on the rear of the socket part 4 of the casing 1. The pairs of ears 11 are disposed diametrically opposite in a line extending centrally of the sign 10′ on the band 10, and said pairs of ears 11 with the laterally projecting portion 9 of the socket part 4, serve as means for readily locating the band 10 and holding the same against relative rotary movement in its different positions of adjustment as regards the disposition of its sign 10′ to the front or rear of the casing 1. The band 10 is provided on its lower end intermediate the pairs of ears 11 with inwardly projecting segmental flange portions 12 to engage between the bottom wall 5′ of the upper socket part 5 of the collar or thimble of the container and the upper end of the socket part 4, so that when the band 10 is fitted over the collar or thimble of the container, and the latter is seated in the socket part 4 of the casing 1, the band 10 will be securely held fixed against rotary and longitudinal movement relatively to the casing 1, said ring like member 10, as will be understood, being adapted to be fitted over the container from the lower end thereof. By withdrawing the container slightly from the socket part 4, the ring like member 10 may be raised sufficiently to disengage the pairs of ears 11 from the lateral projection 9 of the socket part 4, and the ring like member 10 may be then readily set in position with its sign in view or out of view, as desired, by engaging either of the pairs of ears 11 with said laterally projecting portion 9 of the casing.

Means is provided for locking the container to the casing 1 and which also serves to lock the ring like indicator band in its different positions of adjustment, said means comprising a latch member 13 adapted to engage the lug 8 on the lower section 6 of the collar or thimble of the container. The lug 8 is provided with a recess 14 intermediate its ends, said recess having a flat bottom wall 14′. The latch member 13, is shown in this instance as consisting of a relatively short rotatable shaft, semicircular in cross section, having a flat face 13′ to engage over the bottom wall 14′ of a recess 14 of the lug 8. The casing 1 is provided with a tubular boss or extension 15 adjoining the socket part 4 providing a cylindrical chamber 16 to receive a lock 17, and a smaller cylindrical chamber 18 for the latch member 13, said chambers extending transversely of the tubular lateral extension 9 of the socket part, and the smaller chamber 18 communicating with the recess 9, the rotatable latch member 13 being fixed to the shaft 17′ of the lock 17 to be operated thereby to engage over the bottom wall 14′ of the recess 9 of the lug 8, or turned back into the chamber 18 out of engagement and the path of the lug 8, as indicated respectively in full and dotted lines in Figure 4 of the drawings. The lock 17 may be of any suitable construction, that shown being one of the well known forms of key operated permutation cylinder locks, the same being secured in the chamber 16 by any suitable means.

It will be noted that by the particular construction and arrangement of parts hereinbefore set forth, indicating means of a simple efficient nature is provided that can be readily applied to a dispensing device, and that can be quickly and easily set or positioned, as desired, the indicating means being compactly arranged with the structure of the dispensing apparatus and provision being made against the unauthorized operation of the same.

While a specific embodiment of the invention is illustrated in the drawings, I desire it to be understood that changes and variations in the particular construction shown may be made, and the invention may be embodied in other forms, and employed with various kinds of dispensing devices, as will appeal to those skilled in the art and falling within the scope of the appended claims without departing from the spirit of the invention.

Certain subject matter herein disclosed is made the subject matter of claims in my copending application Serial No. 737,362, filed September 12, 1924.

What I claim is:

1. In a dispensing device, a supporting casing including a socket part, a container having a lower part adapted to detachably seat in said socket part and having an outwardly extending lateral projecting portion, a ring like member adapted to fit over a lower portion of the container and bearing a sign thereupon, said ring like member being adapted to be adjusted relatively to the socket part to position the same with its sign facing to the front of the casing in view or to position the same with its sign out of said position disposed at a different point about the casing, the ring like member having an inwardly extending portion on the lower part thereof adapted to engage between said outwardly projecting portion of the container and the upper portion of the socket part.

2. In a dispensing device, a supporting casing including a socket part, a container having a lower part adapted to detachably seat in said socket part and having an outwardly extending lateral projecting portion, a ring like member adapted to fit over a lower portion of the container and bearing thereupon a sign, said ring like member being adapted to be adjusted relatively to the socket part to position the same with its sign facing to the front of the casing in view or to position the same with its sign out of said position at another point about the casing, an inwardly extending portion on the lower part of said ring like member adapted to engage between said outwardly projecting portion of the container and the upper portion of the socket part, and means for locking the container to the socket part.

3. In a dispensing device, a supporting casing including a socket part, a container having a lower part adapted to detachably seat in said socket part and having an outwardly projecting portion at its upper end, a band like member adapted to fit over a lower portion of the container from the lower end thereof and bearing thereupon a sign, said band like member being adapted to be adjusted relatively to the socket part to position the same with its sign facing to the front of the casing in view or to position the same with its sign out of said position at another point about the casing, an inwardly extending portion on the lower part of said band like member adapted to engage between said outwardly projecting portion of the container and the upper portion of the socket part, and means on said band like member and the socket part adapted to interfit one with the other for holding the band like member in its different positions of adjustment against rotary movement relatively to the casing.

4. In a dispensing device, a supporting casing including a socket part, a container having a lower part adapted to detachably seat in said socket part and having an outwardly projecting flange extending around its upper end, a band like member adapted to fit over a lower portion of the container from the lower end thereof and bearing thereupon a sign, said band like member being adapted to be positioned relatively to the socket part to position the same with its sign facing to the front of the casing in view or out of said position at another point about the casing out of view, said band like member having an inwardly projecting flange extending around its lower end and adapted to engage between said outwardly projecting flange of the container and the upper portion of the socket part, and means for locking the container to the socket part.

5. In a dispensing device, a supporting casing including a socket part, a container having a lower portion to detachably seat in said socket part, an outwardly projecting lug on the socket part disposed in line with the central line of the casing from front to rear, a band like member bearing thereupon a sign and adapted to detachably fit upon a lower portion of the container above the socket part, said band like member being adapted to be adjusted relatively to the container and the socket part to position the same with its sign facing to the front of the casing in view or facing to the rear of the casing out of view, the band like member being provided with a pair of notched portions disposed at diametrically opposite points at its lower end in a line extending centrally of said sign and adapted to engage with the lug of the casing to position and hold the band like member in its different positions of adjustment against rotary movement relatively to the casing.

6. In a dispensing device, a supporting casing including a socket part, a container having a lower portion to detachably seat in said socket part, a portion on the socket part disposed in a line extending centrally of the casing from front to rear, a band like member bearing thereupon a sign and adapted to detachably fit upon a lower portion of the container above the socket part, said band like member being adapted to be adjusted relatively to the container and the socket part to position the same with its sign facing to the front of the casing in view or toward the rear of the casing out of view, said band like member being provided with portions disposed at diametrically opposite points at its lower end in a line extending centrally of said sign and adapted to separately engage with the said centrally located portion on the socket part to position and hold the band like member in its different positions of adjustment against rotary movement relatively to the casing.

7. In a dispensing device, a supporting casing including a cylindrical socket part having a tubular lateral extension, a cylindrical glass container tube provided with a metal thimble on the lower end thereof, said thimble having an upper socket part in which the lower end of the glass container tube is secured, and a lower extension of less diameter than said socket part, the bottom wall of the socket part of the thimble forming an annular shoulder at the upper end of said extension, said lower extension of the thimble being adapted to detachably seat in the socket of the casing, and being provided with a lug to fit within the tubular lateral extension of the socket part of the casing to hold the same against rotary movement relatively to said socket part, and key operated means on the casing to lock the thimble to the casing against movement longitudinally relatively thereto, said means including a latch member adapted to engage a notched portion of said lug.

8. In a dispensing device, a supporting casing including a cylindrical socket part having a tubular lateral extension located in line with the central line of the casing from front to rear, a cylindrical glass container tube provided with a metal thimble on the lower end thereof, said thimble having an upper socket part in which the lower end of the glass container tube is secured, and a lower extension of less diameter than said socket part, the bottom wall of the socket part of the thimble forming an annular shoulder at the upper end of said extension, said lower extension of the thimble being adapted to detachably seat in the socket of the casing and being provided with a lug to fit within the tubular lateral extension of the socket part of the casing to hold the same against rotary movement relatively thereto, key operated means on the casing to lock the thimble against movement longitudinally relatively thereto, and a band like member bearing a sign thereupon and adapted to fit over the upper part of said thimble, said band like member being adapted to be adjusted relatively to the thimble and the socket part of the casing to position the same with its sign facing toward the front of the casing in view or toward the rear thereof out of view, said band like member having an inwardly extending flange at its lower end to engage between the bottom wall of the socket part of the thimble, and the upper end of the socket part of the casing, and a pair of notched portions on the lower end of the band like member disposed diametrically opposite in a line extending centrally of said sign and adapted to engage with the tubular extension of the socket part of the casing to position and hold the band like member against rotary movement relatively to the socket part of the casing.

9. In a dispensing device, the combination with a supporting casing including a socket part, a container having a lower part adapted to detachably seat in said socket part, of a separate ring like member bearing a sign thereupon, said ring like member being adapted to detachably fit on the container for rotary adjustment relatively thereto and to the said socket part to position the same with its sign facing to the front of the casing in view or to position the same with its sign out of said position disposed at a different point about the casing out of view.

10. In a dispenser device, the combination with a supporting casing including a socket part, a container having a lower part adapted to detachably seat in said socket part, of a separate ring like member bearing a sign thereupon, said ring like member being adapted to detachably fit on the container for rotary adjustment relatively thereto and to the said socket part to position the same with its sign facing to the front of the casing in view or to position the same with its sign out of said position disposed at a different point about the casing out of view, and means for holding the ring like member in its different positions of adjustment against rotary movement relatively to the container and the casing.

11. In a dispensing device, the combination with a supporting casing including a socket part, a container having a lower part adapted to detachably seat in said socket part, of a separate ring like member bearing a sign thereupon, said ring like member being adapted to detachably fit on the lower part of the container for rotary adjustment relatively thereto and to said socket part to position the same with its sign facing to the front of the casing in view or to position the same with its sign out of said position disposed at a different point about the casing out of view, means for holding the ring like member in its different positions of adjustment against rotary movement relatively to the container and casing, and means for locking the ring like member to the casing in its different positions of adjustment.

12. In a dispensing device, the combination with a supporting casing including a socket part, a container having a lower part adapted to detachably seat in said socket part, of a separate ring like member bearing a sign thereupon, said ring like member being adapted to detachably fit on the lower part of the container for rotary adjustment relatively thereto and to the said socket part to position the same with its sign facing to the front of the casing in view or to position the same with its sign out of said position disposed at a different point about the casing out of view, and means for locking the ring like member in its different positions of adjustment to the casing.

In testimony whereof I hereunto affix my signature.

EDWIN G. WESSMAN.